(12) United States Patent
Kim et al.

(10) Patent No.: US 9,146,629 B2
(45) Date of Patent: Sep. 29, 2015

(54) MOBILE TERMINAL AND 3D IMAGE CONTROLLING METHOD THEREOF

(75) Inventors: Jonghwan Kim, Incheon (KR); Krishna Mohan, Bangalore (IN); Bipin Therat Sethumadhavan, Bangalore (IN); Narayanappa Ramdas, Bangalore (IN)

(73) Assignee: LG Electronics Inc., Seoul (KR)

( * ) Notice: Subject to any disclaimer, the term of this patent is extended or adjusted under 35 U.S.C. 154(b) by 230 days.

(21) Appl. No.: 13/446,120

(22) Filed: Apr. 13, 2012

(65) Prior Publication Data

US 2012/0262398 A1    Oct. 18, 2012

(30) Foreign Application Priority Data

Apr. 14, 2011    (KR) .................. 10-2011-0034843

(51) Int. Cl.
*G06F 3/0482* (2013.01)
*G06F 3/041* (2006.01)
*G06F 3/0481* (2013.01)

(52) U.S. Cl.
CPC .............. *G06F 3/041* (2013.01); *G06F 3/0482* (2013.01); *G06F 3/04815* (2013.01)

(58) Field of Classification Search
USPC .......................... 345/173, 174, 175; 715/788
See application file for complete search history.

(56) References Cited

U.S. PATENT DOCUMENTS

| | | | |
|---|---|---|---|
| 2005/0091609 A1* | 4/2005 | Matthews et al. | 715/804 |
| 2009/0208052 A1* | 8/2009 | Kaplan | 382/103 |
| 2011/0161849 A1* | 6/2011 | Stallings et al. | 715/768 |
| 2011/0164029 A1* | 7/2011 | King et al. | 345/419 |
| 2011/0179368 A1* | 7/2011 | King et al. | 715/769 |
| 2011/0316679 A1* | 12/2011 | Pihlaja | 340/407.2 |
| 2011/0316790 A1* | 12/2011 | Ollila et al. | 345/173 |

FOREIGN PATENT DOCUMENTS

| | | | | |
|---|---|---|---|---|
| EP | 1 956 472 A1 * | 1/2007 | .............. | G06F 3/048 |
| EP | 1956472 A1 * | 8/2008 | | |

* cited by examiner

*Primary Examiner* — Dwayne Bost
*Assistant Examiner* — Robert Michaud
(74) *Attorney, Agent, or Firm* — Ked & Associatec, LLP

(57) ABSTRACT

Disclosed are a mobile terminal for controlling a 3D image using proximity touch, and a 3D image controlling method thereof. Aligning, moving and re-aligning a specific 3D object inside a 3D object group are performed, through proximity hovering. And, depth of the 3D object is automatically controlled by the various operations. This may provide various 3D-related interfaces to a user.

26 Claims, 15 Drawing Sheets

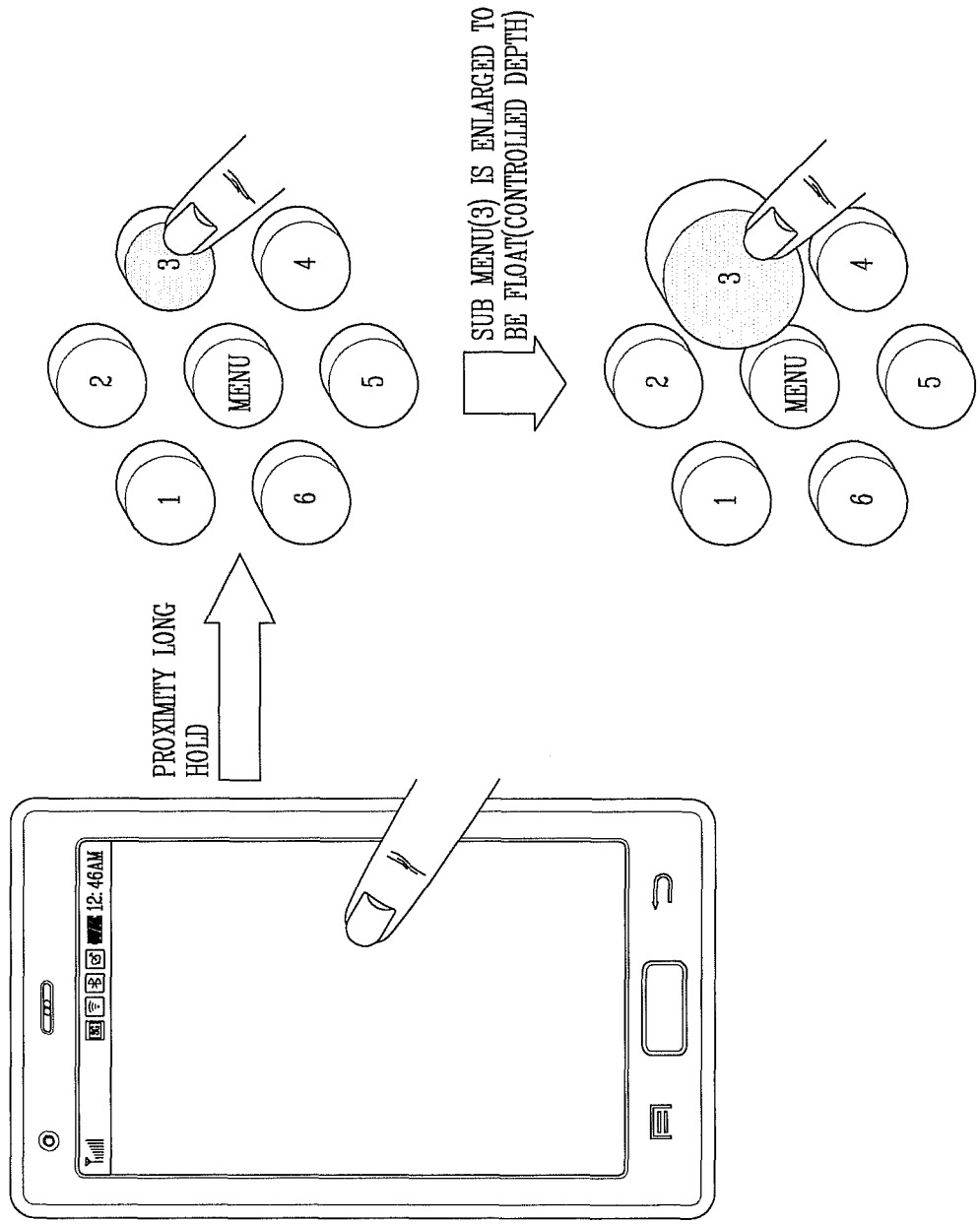

MOBILE TERMINAL AND 3D IMAGE CONTROLLING METHOD THEREOF

CROSS-REFERENCE TO RELATED APPLICATION

Pursuant to 35 U.S.C. §119(a), this application claims the benefit of earlier filing date and right of priority to Korean Application No. 10-2011-0034843, filed on Apr. 14, 2011, the contents of which is incorporated by reference herein in its entirety.

BACKGROUND OF THE INVENTION

1. Field of the Invention

The present disclosure relates to a mobile terminal, and particularly, to a mobile terminal capable of controlling 3D images and performing inter-image movement using proximity touch, and a 3D image controlling method thereof.

2. Background of the Invention

As a user can view videos or television programs by receiving broadcasting or multicast signals through a mobile terminal, a battery of a larger capacity is required. However, a battery having a sufficient capacity has not developed despite of continuous research. This may cause the user not to view videos or television programs through the mobile terminal, unless a charging operation is not performed by determining a charging time and a charging method based on the remaining amount of the battery.

As functions of the terminal become more diversified, the terminal can support more complicated functions such as data and voice communications, capturing images or video by a camera, voice storing, reproducing music or video files through a speaker system, displaying images or videos, and the like. Some mobile terminals include an additional function for playing games, and other mobile terminals include are implemented in the form of a multimedia device. Recent mobile terminals are configured to allow a user to view videos or TV programs by receiving broadcasting or multicast signals.

Various attempts have been made to implement enhanced functions of the mobile terminal not only by structural improvements, but also by hardware or software improvements. A touch function of the mobile terminal allows even a user having a difficulty in inputting buttons or keys to conveniently operate the mobile terminal, by using a touch screen. Recently, this touch function is considered as an important function of the mobile terminal, together with a User Interface (UI) as well as simple input. Accordingly, developing a suitable UI is required more.

Recently, a mobile terminal is being developed to display 3D images for depth perception or stereovision, in a more advanced manner than displaying 2D images. Accordingly, contents is being provided in the form of 3D images not only in the field of film and TV, but also a mobile terminal.

However, a user interface (UI) for allowing a user to conveniently enjoy 3D images on a mobile terminal is not sufficiently provided.

SUMMARY OF THE INVENTION

Therefore, an aspect of the detailed description is to provide a mobile terminal capable of controlling 3D images through proximity touch, and a 3D image controlling method thereof.

Another aspect of the detailed description is to provide a mobile terminal capable of controlling 3D images and performing inter-image movement and edition through proximity touch, and a 3D image controlling method thereof.

To achieve these and other advantages and in accordance with the purpose of this specification, as embodied and broadly described herein, there is provided a 3D image controlling method of a mobile terminal, the method comprising: hovering a 3D object of a first group through proximity gesture; moving the hovered 3D object outside a proximity region of the first group; moving the moved 3D object to a proximity region of a second group; and controlling depth of the 3D object aligned in the second group according to a proximity distance to the proximity region of the second group.

The 3D object may include an icon, a gallery, a widget, a menu and an image.

The proximity gesture may be proximity hovering.

The 3D object may have a different hovering speed according to a finger's proximity distance and proximity speed, and the hovered 3D object may be highlighted.

The method may further comprise displaying all 3D objects of the first group in an automatic circulating manner when the proximity gesture is maintained for a first time.

The hovered 3D object may be moved outside the proximity region through proximity short drag, and at the same time, may be shifted to the rearmost side of the first group.

The step of moving the 3D object outside a proximity region of the first group may include holding the hovered 3D object for a particular time; displaying a transparent screen if the hovered 3D object is maintained for a second time; displaying all 3D objects of the first group on the transparent screen in an unfolding manner, in the form of 2D objects; and moving the displayed 2D objects outside the transparent screen through drag.

The 3D object having moved outside the proximity region may be displayed on a corresponding position in a fixed manner, and the transparent screens of the first and second groups may be individually displayed.

To achieve these and other advantages and in accordance with the purpose of this specification, as embodied and broadly described herein, there is also provided a mobile terminal comprising: a display unit configured to display a plurality of groups having a plurality of 3D objects; a sensing unit configured to sense proximity gesture with respect to a 3D object of a first group; and a controller configured to move the 3D object outside a proximity region of the first group according to a sensed proximity gesture, and to align the 3D object with a second group by controlling depth of the 3D object according to a proximity distance to the proximity region of the second group, when the 3D object positioned outside the proximity region of the first group has moved to the proximity region of the second group.

The controller may be configured to display all 3D objects of the first group in an automatic circulating manner if the proximity gesture is maintained for a first time.

The controller may be configured to move the hovered 3D object outside the proximity region of the first group and to shift the hovered 3D object to the rearmost side of the first group, if proximity short drag is input after proximity hovering has been detected through touch gesture.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 4A and 4B are views showing an example to display and select a 3D menu, a type of 3D images, using the proximity hovering of FIG. 3;

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

A terminal may be implemented in various types. For instance, the terminal in the present description includes a mobile terminal such as a portable phone, a smart phone, a notebook computer, a digital broadcasting terminal, Personal Digital Assistants (PDA), Portable Multimedia Player (PMP), a navigation system, and a fixed terminal such as a digital TV, a desktop computer, etc. It is assumed that the terminal of the present invention is a mobile terminal. However, it will be obvious to those skilled in the art that the present invention may be also is applicable to the fixed terminal, except for specific configurations for mobility.

Figure 1:
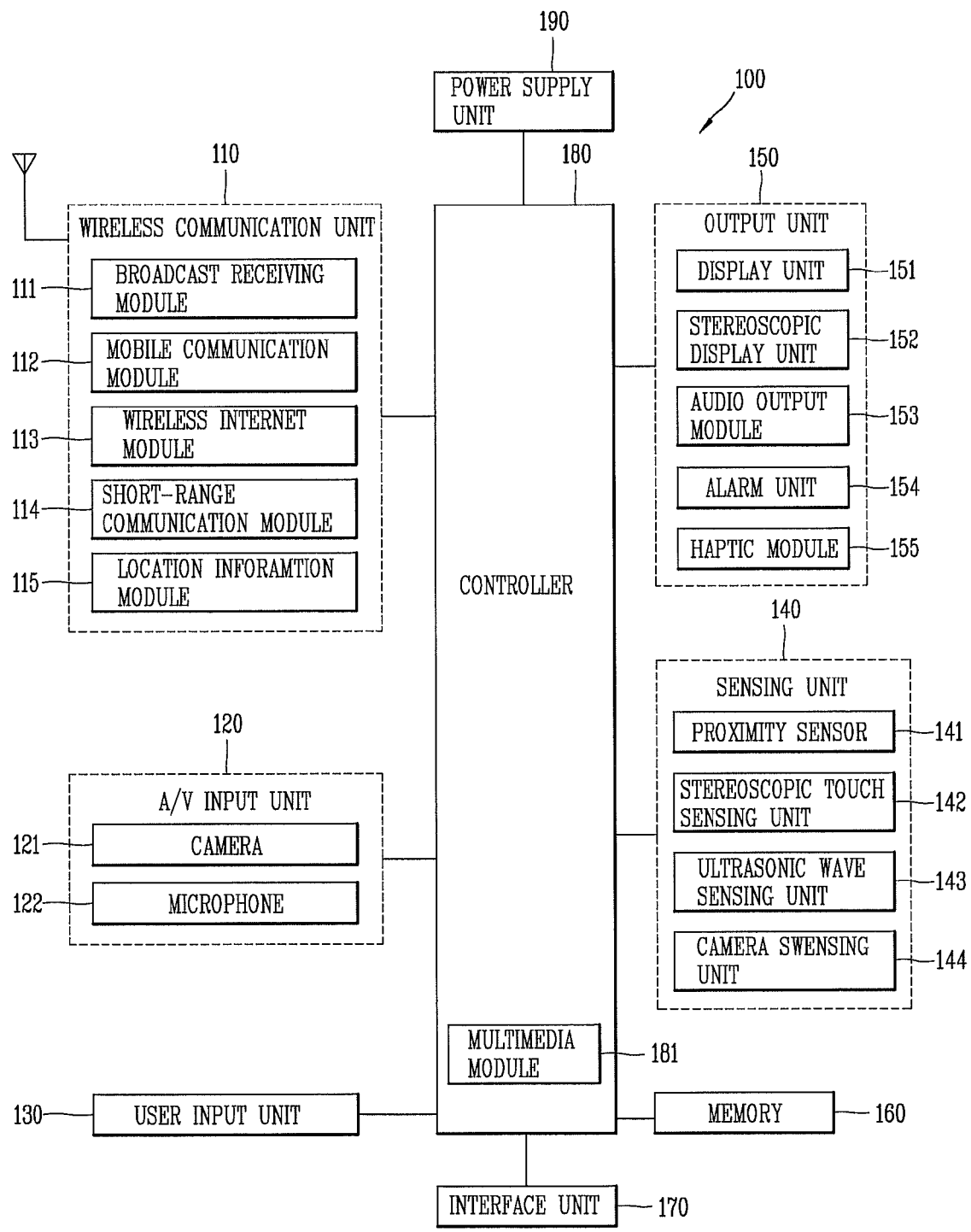
FIG. 1 is a block diagram of a mobile terminal according to a first embodiment of the present invention.

FIG. 1 is a block diagram of a mobile terminal according to an embodiment of the present invention.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or another type of storage medium).

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLA/V), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal. For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore the GPS module may acquire speed information by real time calculating a current position.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141. The user's touch include proximity touch as well as touch, touch & drag, multi-touch and long touch.

The sensing unit 140 includes a geomagnetic sensor configured to calculate a moving direction when a user moves, a gyro sensor configured to calculate a rotation direction, and an acceleration sensor.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

Here, the identification module may be a memory chip that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may operate as signals for recognizing when the mobile terminal is properly mounted on the cradle.

The output unit 150 is configured to provide outputs in a visual, audible, and/or tactile manner (e.g., audio signal, video signal, alarm signal, vibration signal, etc.). The output unit 150 may include the display unit 151, an audio output module 153, an alarm unit 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may be configured to be transparent so that outside may be seen therethrough, which may be referred to as a transparent display. A representative example of this transparent display may include a transparent organic light emitting diode (TOLED), etc. The mobile terminal 100 may include two or more display units 151. For example, the mobile terminal may include both an external display unit (not shown) and an internal display unit (not shown). The touch screen may be configured to detect a touch input pressure as well as a touch input location and a touch input area.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer, and so on.

The alarm unit 154 may provide outputs to inform about the occurrence of an event of the mobile terminal 100. Typical events may include call reception, message reception, key signal inputs, a touch input, etc. In addition to audio or video outputs, the alarm unit 154 may provide outputs in a different manner to inform about the occurrence of an event. The video signal or the audio signal may be output via the display unit 151 or the audio output module 153. Accordingly, the display unit 151 or the audio output module 153 may be classified as a part of the alarm unit 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects (signals) through a user's direct contact, or a user's muscular sense using a finger or a hand. The haptic module 155 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Hereinafter, will be explained a method for processing a user's input to the mobile terminal 100.

The user input unit 130 is manipulated to receive a command for controlling the operation of the mobile terminal 100, and may include a plurality of manipulation units. The manipulation units may be referred to as manipulating portions, and may include any type of ones that can be manipulated in a user's tactile manner.

Various types of visible information may be displayed on the display unit 151. Such information may be displayed in several forms, such as character, number, symbol, graphic, icon or the like. Alternatively, such information may be implemented as a 3D stereoscopic image.

For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another.

For example, an output window and an input window may be displayed at upper and lower portions of the display unit 151, respectively. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted, or a text output on the output window may be input to an application.

In addition to the input manner illustrated in the embodiments, the display unit 151 or the touch pad may be scrolled to receive a touch input. A user may scroll the display unit 151 or the touch pad to move a cursor or pointer positioned on an object (subject), e.g., an icon or the like, displayed on the display unit 151. In addition, in case of moving a finger on the display unit 151 or the touch pad, the path of the finger being moved may be visibly displayed on the display unit 151, which can be useful upon editing an image displayed on the display unit 151.

One function of the mobile terminal may be executed in correspondence with a case where the display unit 151 (touch screen) and the touch pad are touched together within a preset time. An example of being touched together may include clamping a body with the user's thumb and index fingers. The one function, for example, may be activating or deactivating of the display unit 151 or the touch pad.

Figure 2A:
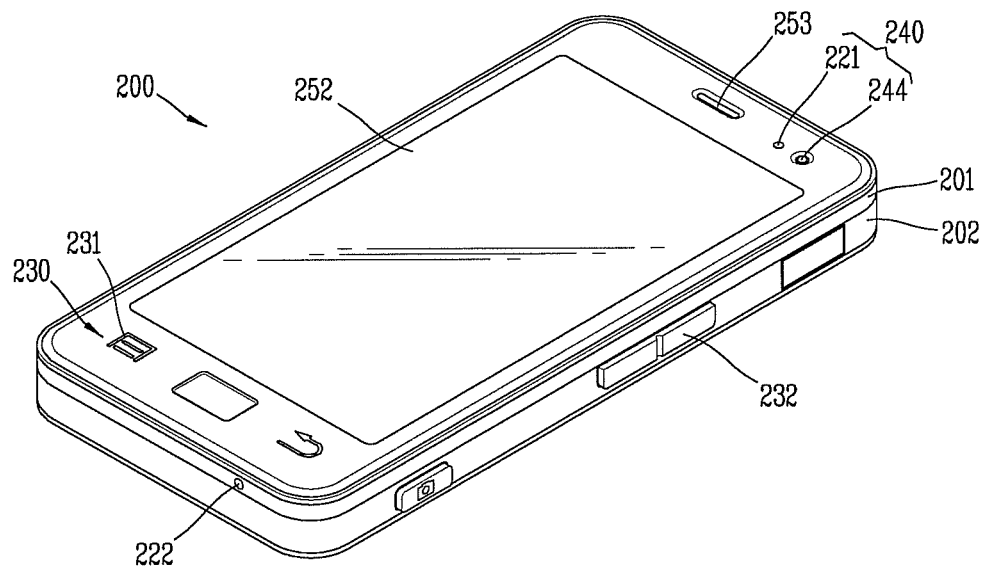
FIGS. 2A and 2B are conceptual views showing an operation of a mobile terminal according to the present invention.
Figure 2B:
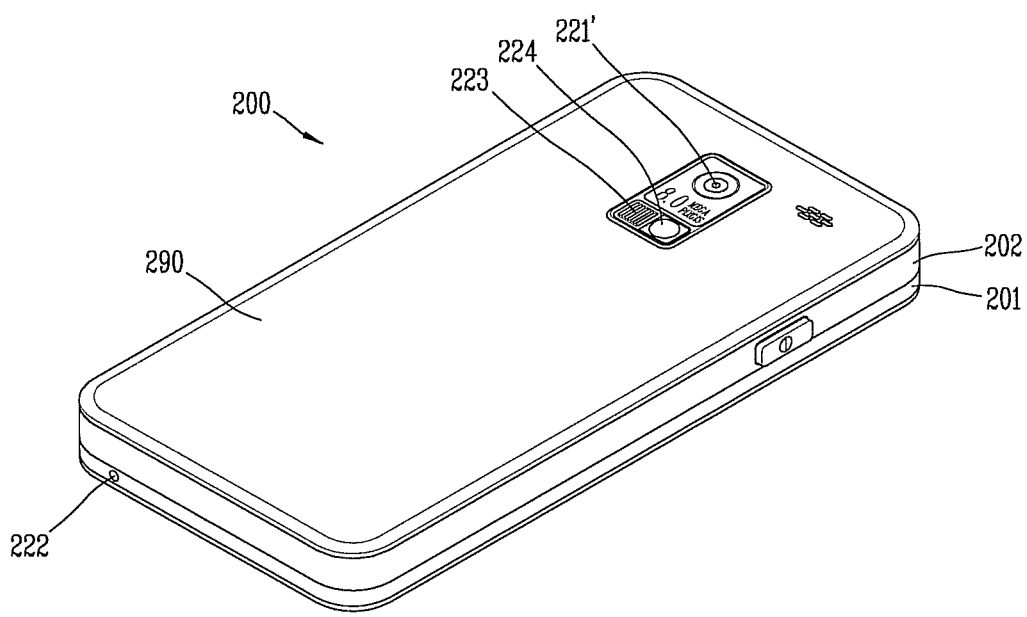

FIG. 2A is a front perspective view of the mobile terminal 100 in accordance with the present disclosure, and FIG. 2B is a rear perspective view of the mobile terminal 100 of FIG. 2A.

As shown in FIG. 2A, the mobile terminal 200 is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming an outer appearance of a body may include a front case 201 and a rear case 202. A space formed by the front case 201 and the rear case 202 may accommodate various components therein. At least one intermediate case may further be disposed between the front case 201 and the rear case 202.

Such cases may be formed by injection-molded synthetic resin, or may be formed using a metallic material such as stainless steel (STS) or titanium (Ti).

At the front case 201, may be disposed a stereoscopic display unit 252, a sensing unit 240, an audio output unit 253, a camera 221, user input units 230, 231 and 232, a microphone 222, an interface unit 270, etc.

The stereoscopic display unit 252 occupies most parts of a main surface of the front case 201. The audio output unit 253 and the camera 221 are arranged at a region adjacent to one end of the stereoscopic display unit 252, and the user input unit 231 and the microphone 222 are arranged at a region adjacent to another end of the display unit 252. The user input unit 232, the interface unit 270, etc. may be arranged on side surfaces of the front case 201 and the rear case 202.

The user input unit 230 is manipulated to receive a command for controlling the operation of the mobile terminal 200, and may include a plurality of manipulation units 231 and 232.

The manipulation units 231 and 232 may receive various commands. For instance, the first manipulation 231 is configured to input commands such as START, END, SCROLL or the like, and the second manipulation unit 232 is configured to input commands for controlling a level of sound outputted from the audio output unit 253, or commands for converting the current mode of the stereoscopic display unit 252 to a touch recognition mode. The stereoscopic display unit 252 forms a stereoscopic touch screen together with the sensing unit 240, and the stereoscopic touch screen may be an example of the user input unit 230.

The sensing unit 240 is configured to sense a user's position. Furthermore, the sensing unit 240 is configured to sense a 3D position of an object (e.g., user's finger or stylus pen) as a 3D sensor. The sensing unit 240 may include a camera 221 and a laser sensor 244. The laser sensor 244 is mounted to the terminal body, and is configured to sense a spaced distance between the terminal body and the object by irradiating laser and sensing reflected laser. The camera 221 is configured to capture 2D positions of a user and an object (refer to FIG. 2A).

For instance, the mobile terminal may determine a user's 2D position based on an image captured by the camera 221, and to recognize an image being currently viewed by the user. Furthermore, the mobile terminal may sense a 3D position of the object, by combining the 2D position captured by the camera 221 with the spaced distance obtained through the laser sensor 244. If the user's 2D image is required, the sensing unit 240 may include only the camera 221. However, the present invention is not limited to this. That is, the sensing unit 240 may include a proximity sensor, a stereoscopic touch sensing unit, an ultrasonic wave sensing unit, etc.

Referring to FIG. 2B, a camera 221' may be additionally provided on the rear case 202. The camera 221' faces a direction which is opposite to a direction faced by the camera 221, and may have different pixels from those of the camera 221.

For example, the camera 221 may operate with relatively lower pixels (lower resolution). Thus, the camera 221 may be useful when a user can capture his face and send it to another party during a video call or the like. On the other hand, the camera 221' may operate with a relatively higher pixels (higher resolution) such that it can be useful for a user to obtain higher quality pictures for later use. The cameras 221 and 221' may be installed at the terminal body so as to rotate or pop-up.

A flash 223 and a mirror 224 (not shown) may be additionally disposed close to the camera 221'. The flash 223 operates in conjunction with the camera 221' when taking a picture using the camera 221'. The mirror 224 can cooperate with the camera 221' to allow a user to photograph himself in a self-portrait mode.

An audio output unit may be additionally arranged on a rear surface of the terminal body. The audio output unit may cooperate with the audio output unit 253 (refer to FIG. 2A) disposed on a front surface of the terminal body so as to implement a stereo function. Also, the audio output unit may be configured to operate as a speakerphone.

A power supply unit 290 for supplying power to the mobile terminal 200 is mounted to the body. The power supply unit 290 may be mounted in the body, or may be detachably mounted to the body.

On the terminal body, not only an antenna for calling, but also a broadcast signal receiving antenna, a Bluetooth antenna, a satellite signal receiving antenna, a radio internet data receiving antenna, etc. may be additionally disposed.

The mobile terminal 100 of FIG. 1 includes a wired/wireless communication system and a satellite-based communication system, and may be operable at a communication system where data can be transferred through frame or packet.

FIG. 2 is a view showing a configuration of a radio charging module 200 according to the present invention.

3D Images

Generally, a 3-dimensional stereoscopic image (hereinafter, will be referred to as 3D image) indicates an image capable of allowing a viewer to view depth and reality of an object disposed on a monitor or a screen as if in the real space. This 3D image is implemented by using binocular disparity. The binocular disparity indicates a parallax formed by two eyes. When a user's two eyes view different 2D images, the images are transmitted to the user's brain through a retina. Then, the images are merged to each other to allow the user to feel depth and reality of the stereoscopic image.

The 3D image may be displayed by a display method such as a stereoscopic method (with-glasses), an auto stereoscopic method (glasses-free) and a projection method (holographic method). The stereoscopic method is mainly applied to a television receiver for home use, and includes a Wheatstone stereoscopic method. The auto stereoscopic method is mainly applied to a mobile terminal, etc., and includes a parallax barrier method and a lenticular method. And, the projection method includes a reflective holographic method, a transmissive holographic method, etc.

Creation and Display of 3D Image

Generally, a 3D image includes a left eye image (image viewed through a left eye) and a right eye image (image viewed through a right eye). A method for synthesizing the left eye image and the right eye image with each other as a 3D stereoscopic image may include a top-down method, an L-to-R (left-to-right, side by side) method, a checker board method, an interlaced method, a time sequential (frame by frame) method, etc. According to the top-down method, the right and left images are arranged in up and down directions in one frame. According to the L-to-R method, the right and left images are arranged in right and left directions in one frame. According to the checker board method, pieces of the right and left images are arranged in the form of tiles. According to the interlaced method, the right and left images are alternately arranged in the unit of rows or columns. And, according to the interlaced method, the right and left images are alternately arranged per hour.

Depth of 3D Image

Depth (or depth value) of a 3D image means an index indicating a 3D distance difference between objects within an image. The depth is defined as 256 levels (maximum value of 255~minimum value). The greater the depth is, the closer a distance between the 3D image and a viewer (or user) is. The depth of the 3D image is controlled as follows. If the 3D image is to be displayed in the original size, the original depth is displayed. However, if the 3D image is to be displayed in a size smaller than the original size, the depth is controlled to be lower.

For instance, in a state where depth is defined as 256 levels, a maximum value is 255 and a minimum value is 0, if the 3D image is to be displayed in the original size, the depth is controlled to be 255. On the other hand, if the 3D image is to be displayed in a size smaller than the original size, the depth is controlled to be a value less than 255.

The present invention is to provide various user interfaces (UIs) capable of performing alignment, realignment, selection, movement and depth control with respect to 3D images and 3D image groups, using proximity touch as a 3D input.

Proximity Hovering

In the present invention, at least one gesture including proximity hovering is used to control 3D images. The gestures include proximity hovering (or proximity hover), proximity short hold, proximity long hold and proximity drag. The gestures are combined with the conventional touch gesture for use, and provide an effective method to align 3D images displayed in a virtual 3D space, i.e., application icons.

The 3D images (objects or items) to be proximity-touched include a 3D gallery, a 3D widget, a 3D menu, and 3D icons, 3D objects and 3D images (including thumbnails) used in 3D chatting. A single 3D image may be displayed in a 3D space, or a plurality of 3D images may be aligned in a 3D space in the form of a group.

Figure 3:
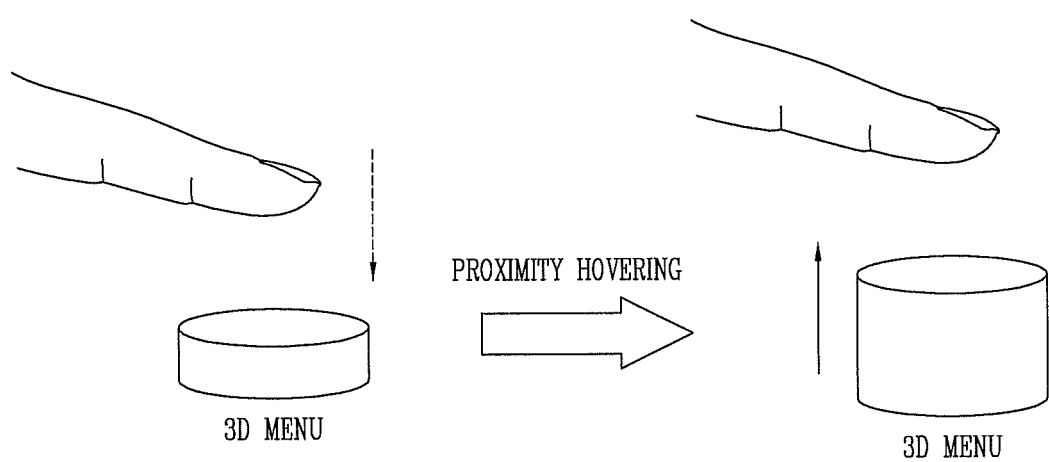
FIG. 3 is a conceptual view of proximity hovering according to the present invention.

FIG. 3 is a conceptual view of proximity hovering according to the present invention.

As shown in FIG. 3, proximity hovering (hovering) means an operation to bounce an object (3D image) to a user's finger in an absorbing manner by positioning the finger at the upper or lateral side of the object. Here, the object may simply bounce, or may be enlarged to be displayed with controlled depth (information indicating hovering).

More specifically, the hovering means that an object (item) is forward pulled or instantaneously enlarged/contracted and color-changed when a proximity sensor senses approaching of a user's finger. If the user's finger stops to hold the object, the uppermost object flutters a little. This may be visually recognized by the user.

When performing the hovering, not only one object (item) but also neighboring objects may be forward pulled with different depths. That is, when the user's finger is positioned on a specific position, a central object is moved the most toward the user's finger, and neighboring objects are moved a little with different depths.

During the hovering, the uppermost object (i.e., the central object) may display information of its movement. For instance, the hovered object may flutter a little up and down, or right and left with the same depth. Alternatively, the hovered object may bounce a little back and forth with different depths.

As another example, the hovered object may be enlarged and contracted repeatedly, and may flash. Also, the color of the hovered object may instantaneously change to another color and the original color, sequentially.

Here, the neighboring objects may operate with a lower intensity than the central object, according to a proximity degree of the user's finger, and are sequentially displayed in the form of waves.

A bouncing speed of an image during proximity hovering may be influenced by a proximity distance or a proximity speed. That is, as a distance between a 3D image and a user becomes short, and as a speed of proximity hovering becomes fast, the object rapidly bounces to the user's finger. Once the 3D image bounces to the user's finger through proximity hovering, the user can select the 3D image in a actual touching manner. Various operations of the present invention to be later explained may be performed through the aforementioned proximity short hold, proximity long hold and proximity drag.

Figure 4B:
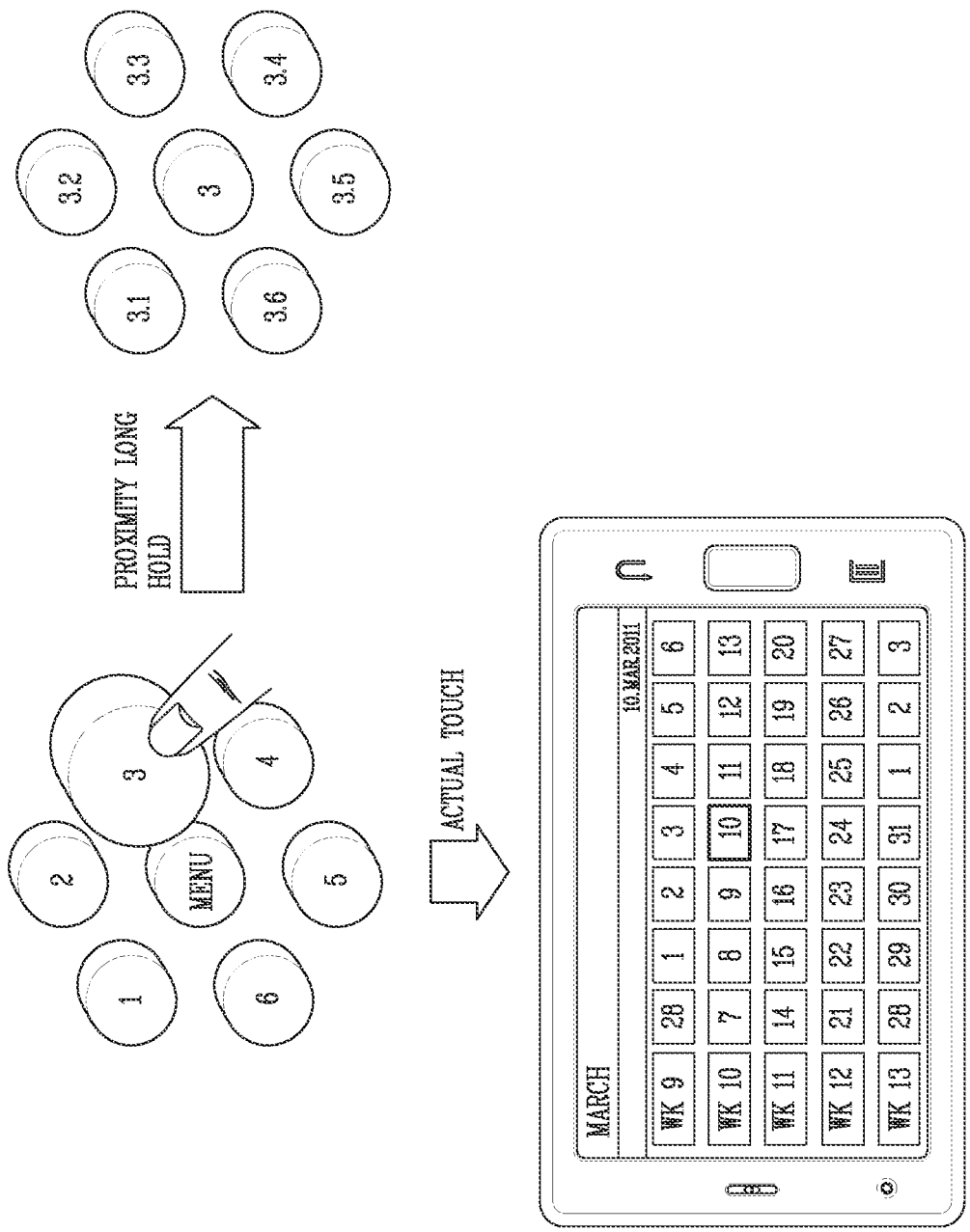

FIGS. 4A and 4B are views showing an example to display and select a 3D menu, a type of 3D images, using the proximity hovering of FIG. 3.

As shown in FIG. 4A, once a screen of the mobile terminal undergoes proximity hold, one main menu and sub menus 1~6 of the main menu are displayed. If the user performs proximity hovering above the sub menu 3, the sub menu 3 bounces to the user's finger with an increased size (pop out).

In this state, if the user performs a proximity long hold gesture, additional sub menus 3.1-3.6 included in the popped-out sub menu 3 are displayed. If the popped-out sub menu 3 is actually touched, the function of the sub menu 3 (e.g., displaying an electronic calendar) is performed.

Hereinafter, a 3D image controlling method using proximity gesture according to the present invention will be explained in more details.

Figure 5:
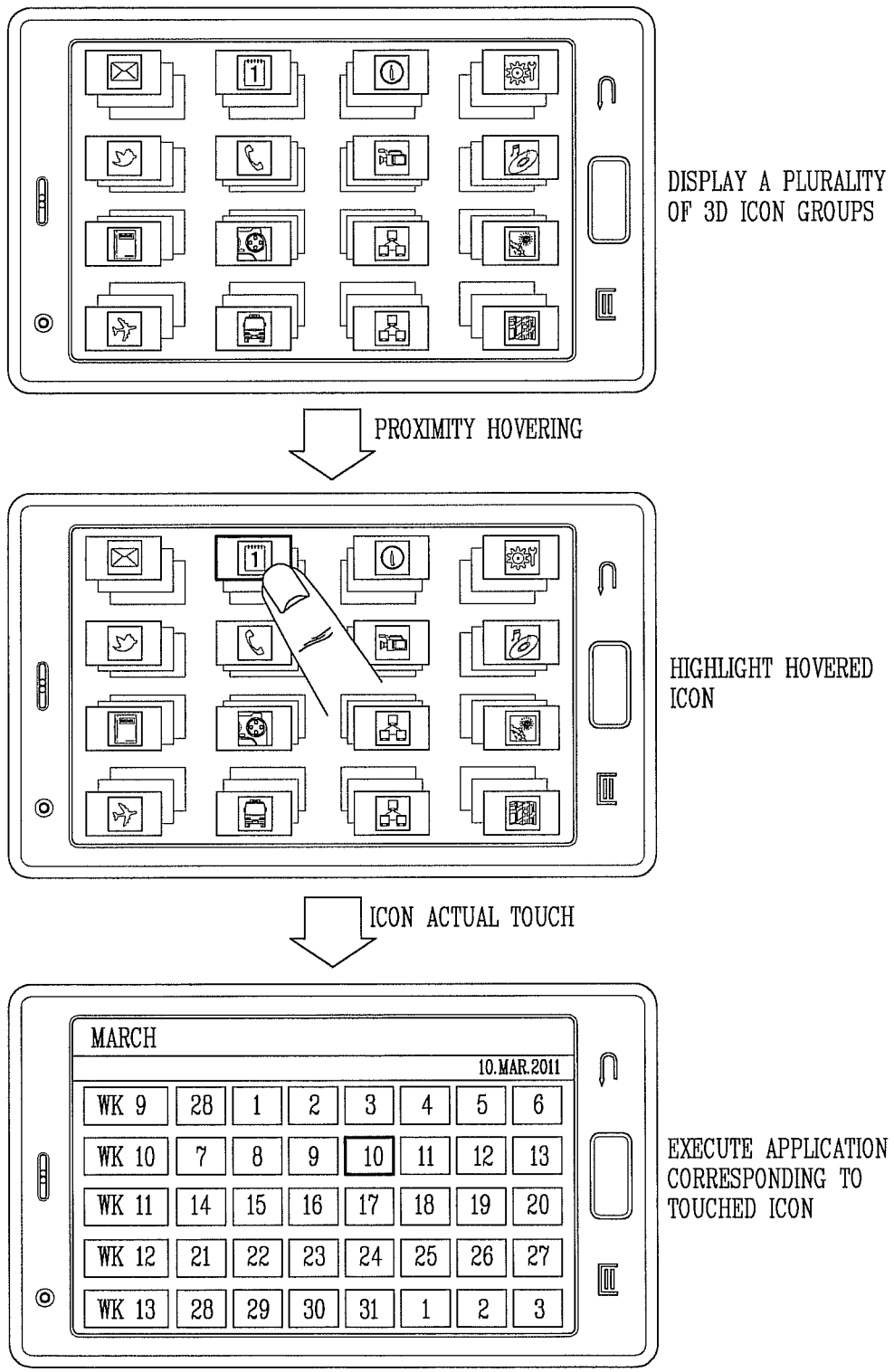
FIG. 5 is a view showing an example to select and execute an 3D icon through proximity hovering in 3D space.

FIG. 5 is a view showing an example to select and execute an 3D icon through proximity hovering in 3D space.

As shown in FIG. 5, once a user selects a particular 3D menu on a home screen, at least one application icon (e.g., 3D icons) is displayed on the screen. The displayed 3D icons are aligned along a Z-axis (3D depth), and each of them is included in one virtual group.

In this state, if the user performs proximity hover with respect to a specific 3D icon group, the 3D icon group bounces (is popped out) and the uppermost 3D icon (closest to the user's finger) is highlighted (or emphasized and edge-processed).

Under this configuration, once the user touches the popped-out 3D icon, the function of the 3D icon (e.g., displaying an electronic calendar) is performed.

Figure 6:
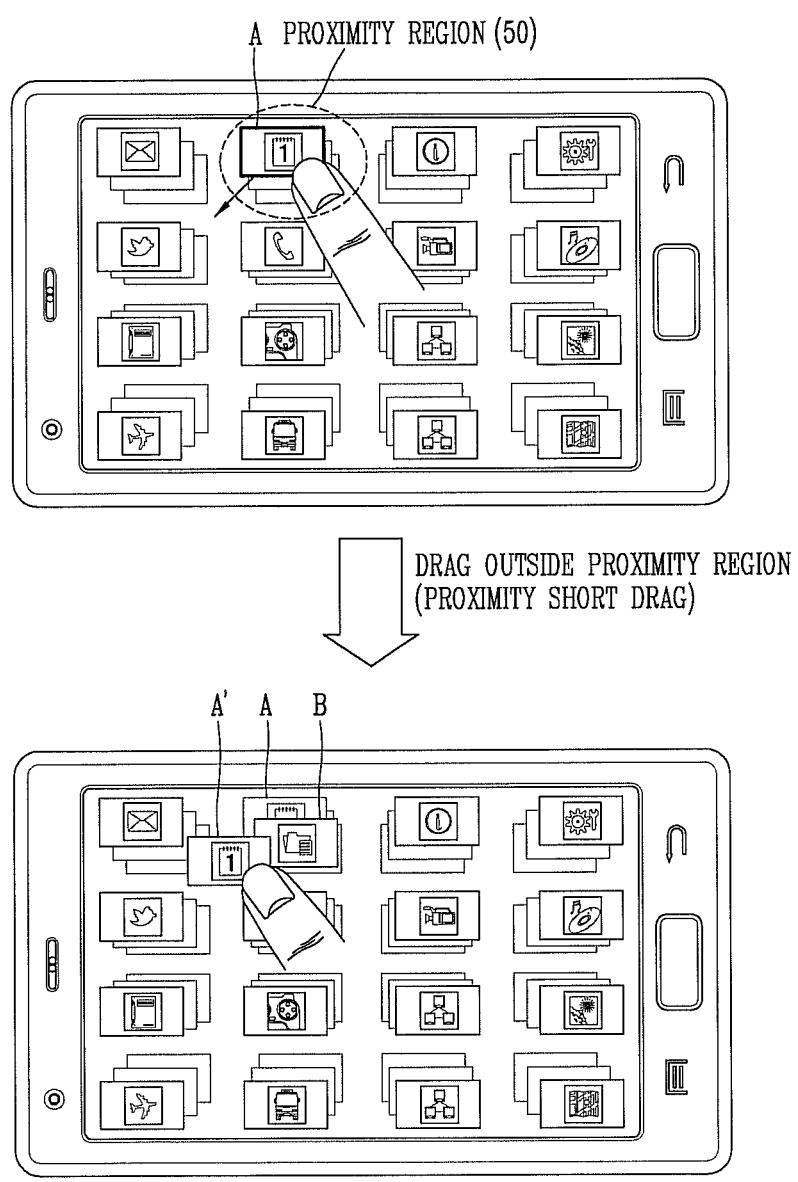
FIG. 6 is a view showing an example to re-align 3D icons aligned in a 3D group.

FIG. 6 is a view showing an example to re-align 3D icons aligned in a 3D group.

In a state where an uppermost 3D icon (A) is highlighted through proximity hovering, a user may drag the 3D icon (A) to a predetermined direction to move from a proximity region 50 to a region outside the proximity region (second region). Here, actual touching is not performed.

Once the 3D icon is moved outside the proximity region 50 through proximity short drag, the moved 3D icon (A') is temporarily displayed on the position. The same 3D icon (A) highlighted in the previous icon group is shifted to the rear side of the icon group, and next uppermost 3D icon (B) beneath the 3D icon (A) is displayed on the uppermost side.

As the icons included in the 3D group are re-aligned (circulated), an application of a desired icon can be executed. However, the re-alignment (circulation) of the icons through proximity short drag are performed in the original order when the user returns to the home screen.

As another embodiment to re-align the order of the icons included in the 3D group, the icons may automatically bounce to the uppermost side in a circulating manner according to each depth while the user's finger is approaching to the 3D group.

The 3D icon (A') having moved outside the proximity region (first region) 50 can move to the original 3D icon group or another 3D icon group. In this case, depth of the 3D icon (A') is controlled according to a proximity distance, such that the icons are automatically re-aligned.

Figure 7:
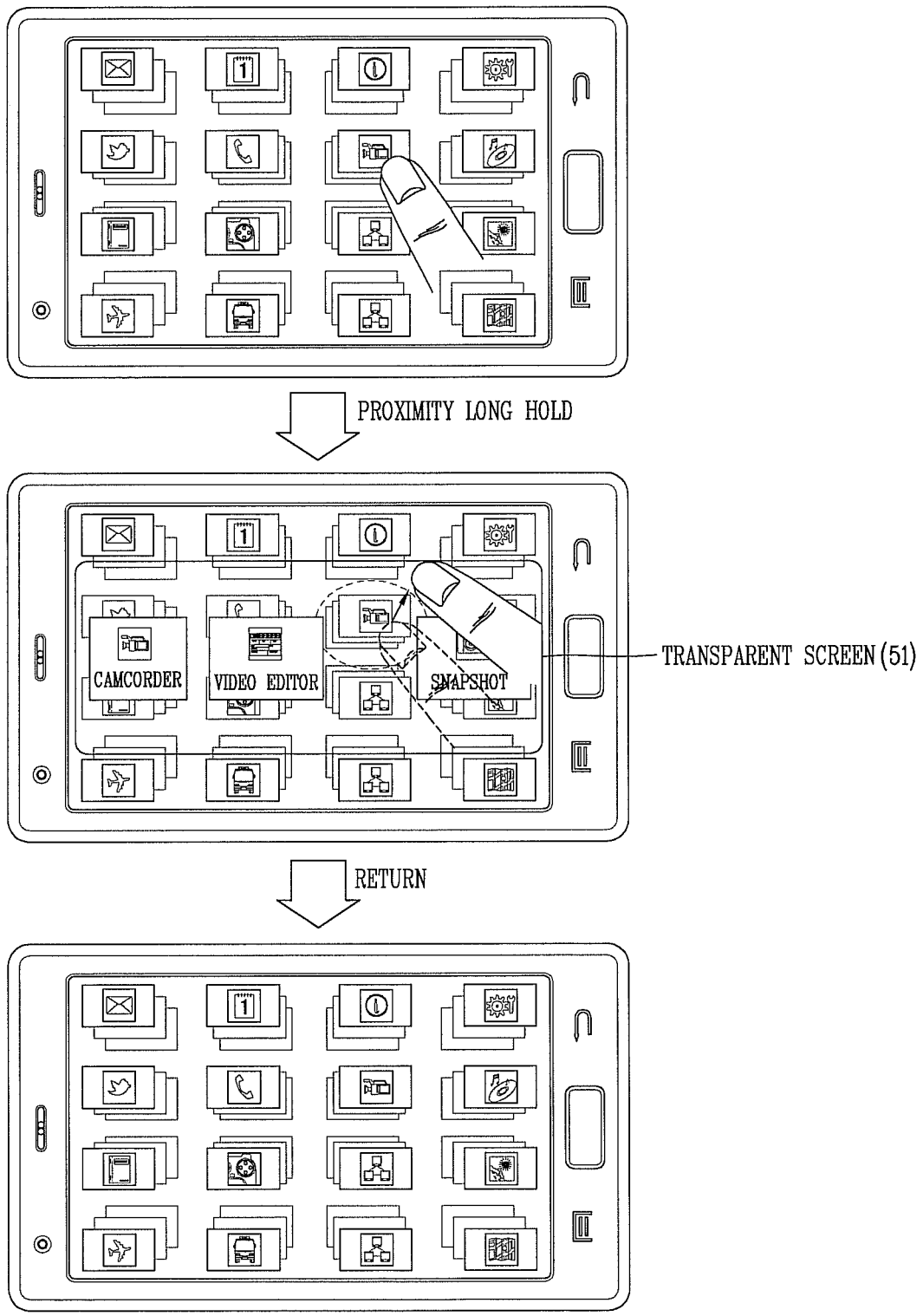
FIG. 7 is a view showing another example to re-align 3D icons aligned in a 3D group.

FIG. 7 is a view showing another example to re-align 3D icons aligned in a 3D group, in which icons of a 3D group are unfolded in a 2D balloon manner.

Once a user maintains a proximity state to a specific 3D icon for a particular time (proximity long hold gesture), icons included in a corresponding group are sequentially unfolded on an additional transparent screen 51 (e.g., icon group balloon) thus to be displayed in the form of 2D icons. The rest icon groups have a small size, and are displayed as if they have moved back along a Z-axis. Here, the proximity hovering is continuously maintained.

Hold time for displaying the transparent screen 51 is set to be longer than hold time for holding and re-aligning the 3D icon group. That is, if the 3D icon group undergoes proximity hold for a first time, the icons included in the 3D icon group are sequentially moved to the uppermost side for re-alignment. On the other hand, if the 3D icon group undergoes proximity hold for a second time, a transparent screen 51 is additionally displayed so that the icons included in the 3D icon group are displayed in the form of 2D icons.

In a state that the icons are displayed on the transparent screen 51 in the form of 2D icons, once a user moves his or her finger outside the transparent screen 51 or the proximity region 50, the transparent screen disappears and the original icon group screen is displayed again.

Figure 8:
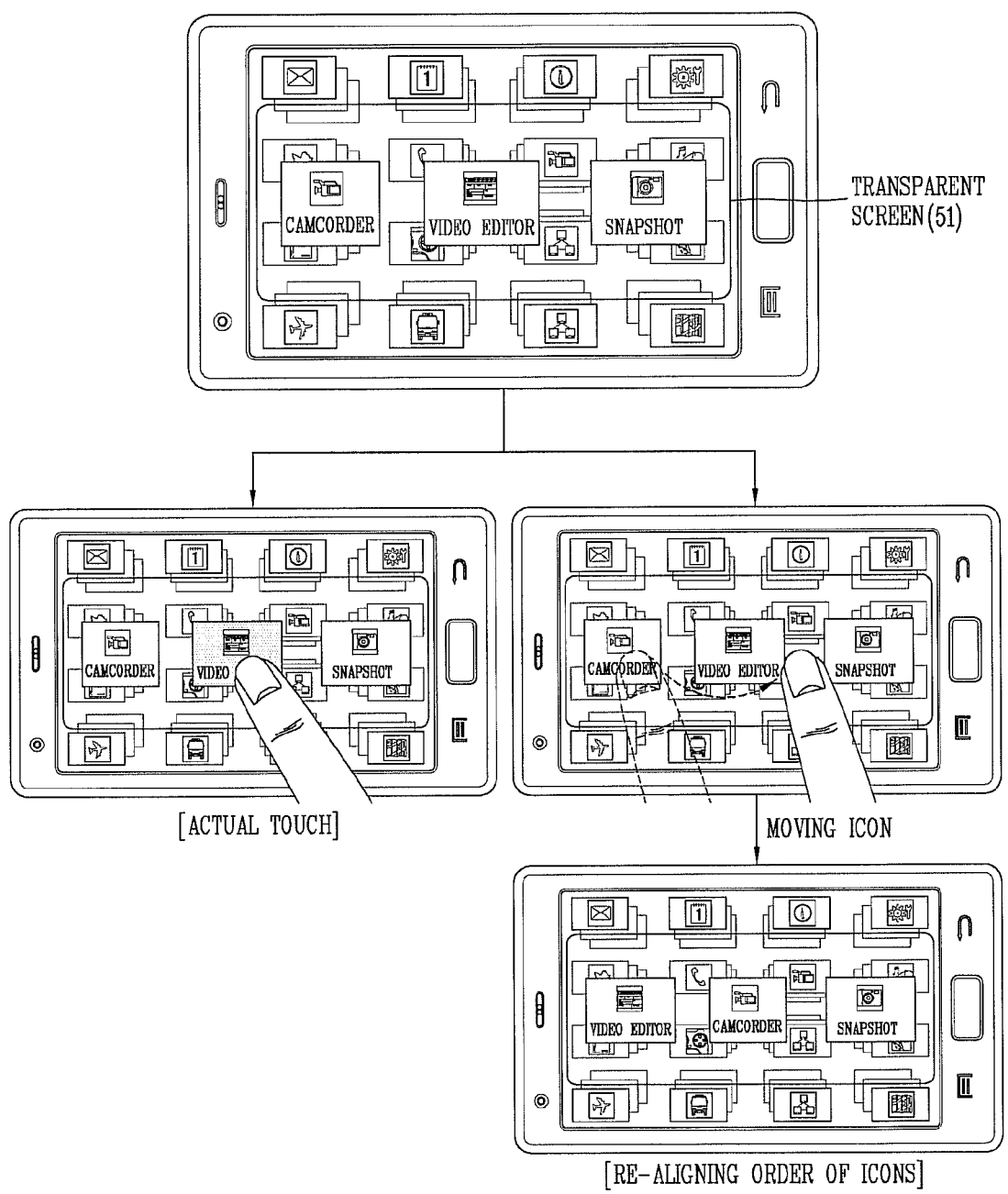
FIG. 8 is a view showing a method for re-aligning icons using a transparent screen according to the present invention.

FIG. 8 is a view showing a method for re-aligning icons using a transparent screen according to the present invention.

In a state that icons are displayed on the transparent screen 51 in the form of 2D icons, a user may select a specific icon or change the order of icons sequentially displayed, through a touch gesture. For instance, if the user directly touches a video editor icon, a video editor function is executed. The user may proximity-hold a camcorder icon displayed on the foremost side of the transparent screen 51 (the uppermost side of the 3D icon group), and then insert the camcorder icon between a video editor icon and a snapshot icon through drag. In this case, the order of the icons changes into the order of "video editor-camcorder-snapshot" from the original order of "camcorder-video editor-snapshot". This order is fixed even if the original icon group screen is displayed after the transparent screen has disappeared. Therefore, the icons included in the 3D icon group are displayed on the uppermost side in the order of "video editor-camcorder-snapshot", and each depth thereof is controlled. Especially, when the user moves the camcorder icon through proximity hold & drag, the controller 180 widens the distance between the video editor icon and the snapshot icon according to a proximity distance so that the corresponding icon can be easily inserted therebetween when the user's finger approaches to the icons.

Figure 9:
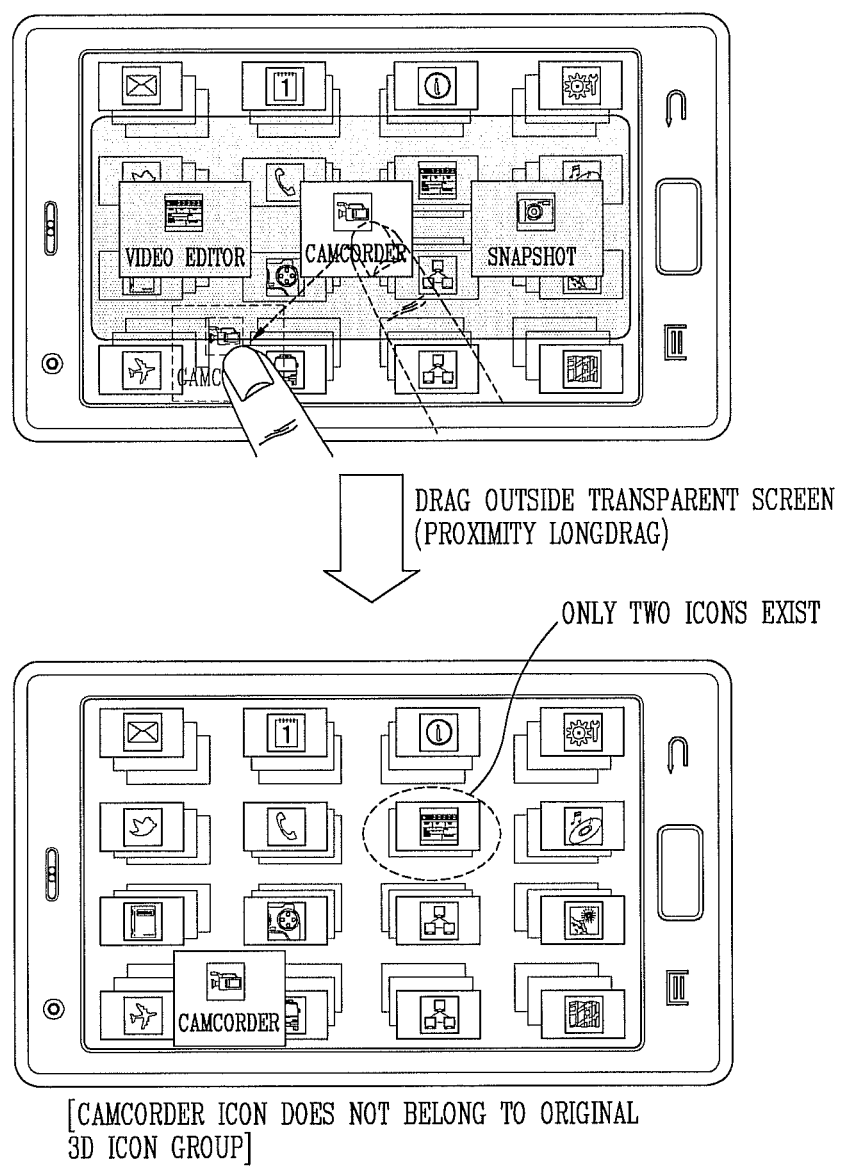
FIG. 9 is a view showing an example to create a new icon group by moving a specific icon included in a 3D group outside a transparent screen.

FIG. 9 is a view showing an example to create a new icon group by moving a specific icon included in a 3D group outside a transparent screen.

As shown in FIG. 9, if a user performs proximity hovering over a specific 3D icon, icons included in a corresponding group are sequentially displayed on an additional transparent screen 51 in the form of 2D icons. If the user proximity-touches a desired icon on the transparent screen, e.g., camcorder icon and moves the icon outside the transparent screen 51, the transparent screen 51 disappears and the camcorder icon is displayed on the corresponding position.

The camcorder icon displayed on the corresponding position does not belong to the previous 3D group any longer, but belong to a new icon group. Accordingly, the 3D group consisting of three icons (camcorder icon, video editor icon and snapshot icon) includes only two icons (video editor icon and snapshot icon).

The "camcorder" icon is displayed on the corresponding position with controlled depth. In the present invention, the proximity region or the transparent screen 51 may be defined as a first region, and a region outside the proximity region or the transparent screen 51 may be defined as a second region.

Figure 10:
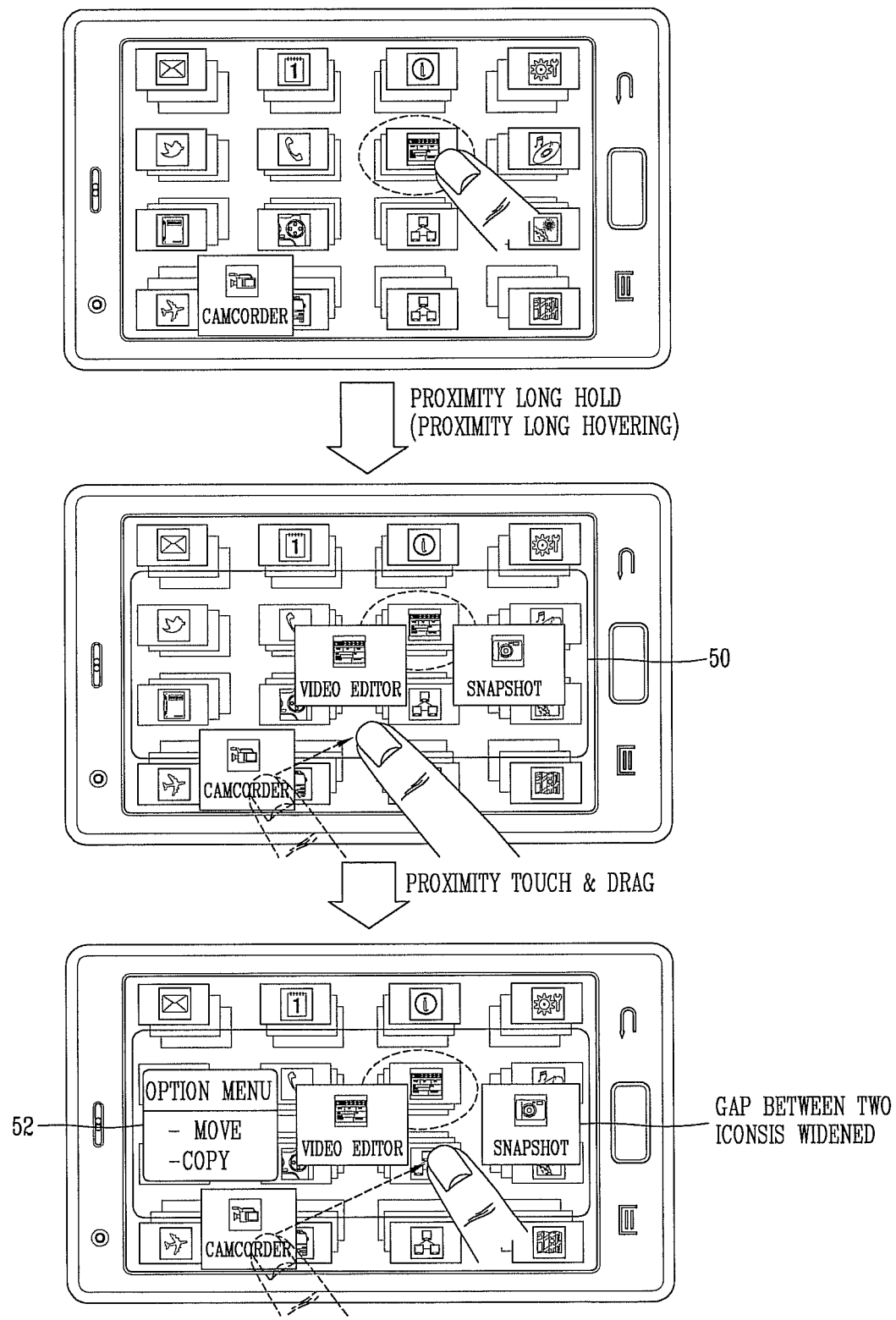
FIG. 10 is a view showing an example to re-move icons having moved outside a transparent screen to the same 3D icon group.

FIG. 10 is a view showing an example to re-move an icon having moved outside the transparent screen to the same 3D icon group.

As aforementioned, the icon having moved outside the transparent screen is not part of the previous 3D group, but is an independent icon. Therefore, in the case of moving the icon having moved outside the transparent screen to the original 3D group back, a user's confirmation is required.

Firstly, the user performs proximity long hovering over a target icon group so that the transparent screen 51 can be displayed. On the displayed transparent screen 51, a video editor icon and a snapshot icon are sequentially displayed in the form of 2D icons.

In a state where the video editor icon and the snapshot icon have been displayed, the user moves the camcorder icon positioned outside the transparent screen (first region) into the transparent screen through proximity touch & drag. Once the camcorder icon has moved to a specific position, e.g., between the video editor icon and the snapshot icon, the controller 180 widens the gap between the two icons and displays an additional option menu. The option menu includes move or copy. If the user selects "move" from the option menu, the camcorder icon is inserted between the video editor icon and the snapshot icon.

Once the camcorder icon is inserted between the video editor icon and the snapshot icon, the user releases the proximity touch. Then, the inserted camcorder icon has depth automatically controlled according to the corresponding position, and is displayed in the form of a 3D icon.

Figure 11:
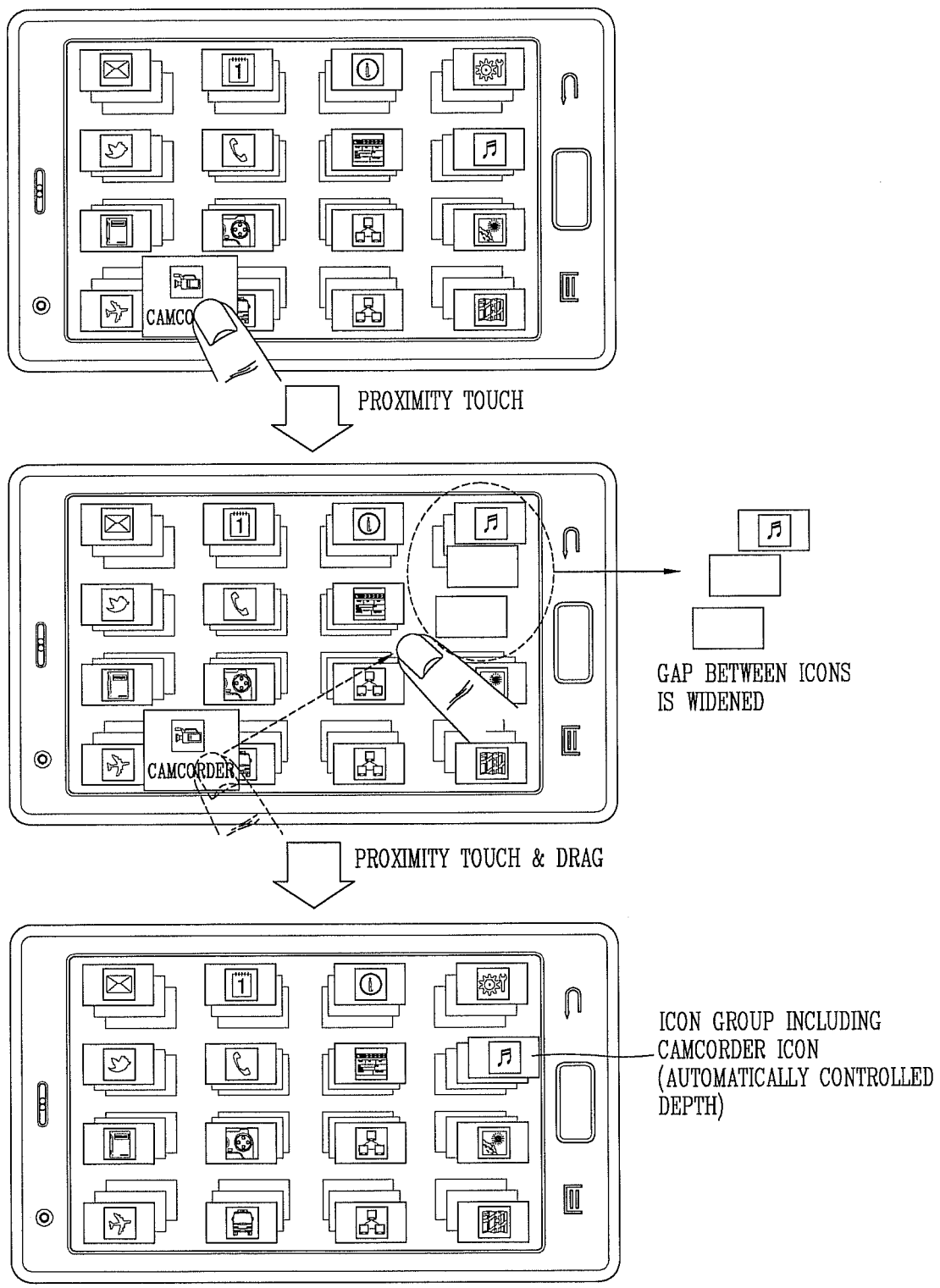
FIG. 11 is a view showing an example to move icons having moved outside a transparent screen to another 3D icon group.

FIG. 11 is a view showing an example to move an icon having moved outside the transparent screen to another 3D icon group.

In order to move the camcorder icon to another 3D group, the user proximity-touches the camcorder icon, and drags the camcorder icon to a desired 3D group (target 3D group). Once the camcorder icon approaches to the target 3D group through drag, the gap between icons included in the target 3D group is widened according to a proximity distance. That is, as the camcorder icon more approaches to the target 3D group, the gap between the icons included in the target 3D group is more widened.

Once the user moves the camcorder icon to a specific position between the icons having a widened gap therebetween, depth of the camcorder icon is automatically controlled in correspondence to the specific position. Therefore, the camcorder icon having controlled depth is included in a new 3D group.

Figure 12:
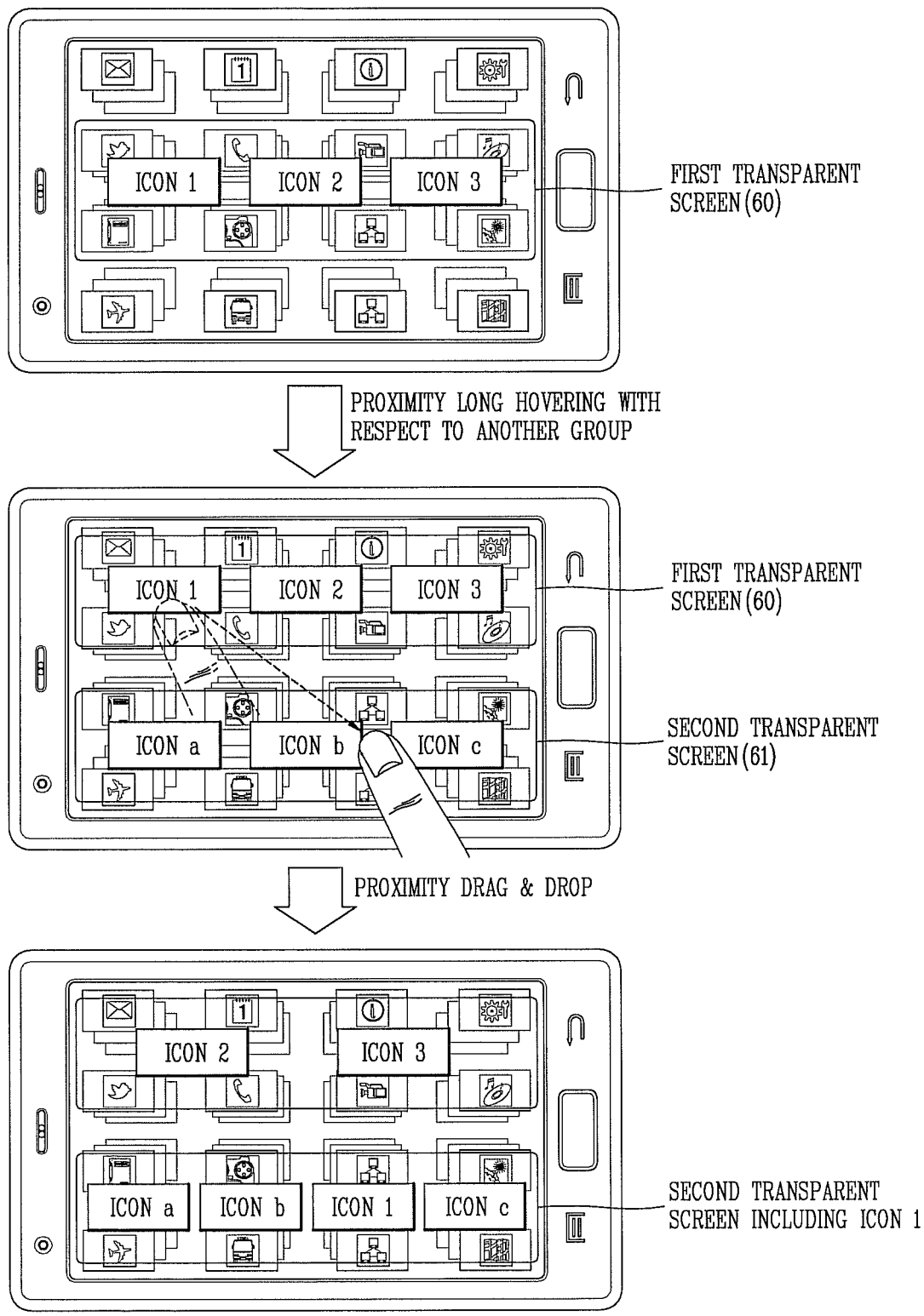
FIG. 12 is a view showing an example to move icons among a plurality of 3D groups, in which icons are directly moved by using a plurality of transparent screens.

FIG. 12 is a view showing an example to move icons among a plurality of 3D groups, in which icons are directly moved by using a plurality of transparent screens.

Firstly, a user displays icons to be moved on each transparent screen in the form of 2D icons. That is, the user performs proximity long hovering over a first icon group, so that a first transparent screen 60 including icons "1, 2 and 3" can be displayed. Then, the user performs proximity long hovering over a second icon group, so that a second transparent screen 61 including icons "a, b and c" can be displayed.

Once the 2D icons are displayed on the first transparent screen 60 and the second transparent screen 61, the user proximity-touches the icon 1 of the first transparent screen 60. Then, the user moves the icon 1 to a specific position, e.g., between the icon 'b' and the icon 'c' of the second transparent screen 61, through drag. Here, the controller determines depth of the icon 1 according to a proximity distance of the icon 1, and widens the gap between the icons (e.g., the gap between the icon 'b' and the icon 'c').

Then, the icon 1 is moved to a position between the icon 'b' and the icon 'c', and the user's finger is moved outside the transparent screen 61 or the proximity touch is released. As a result, the controller 180 displays the icon 1 in the second group.

Figure 13:
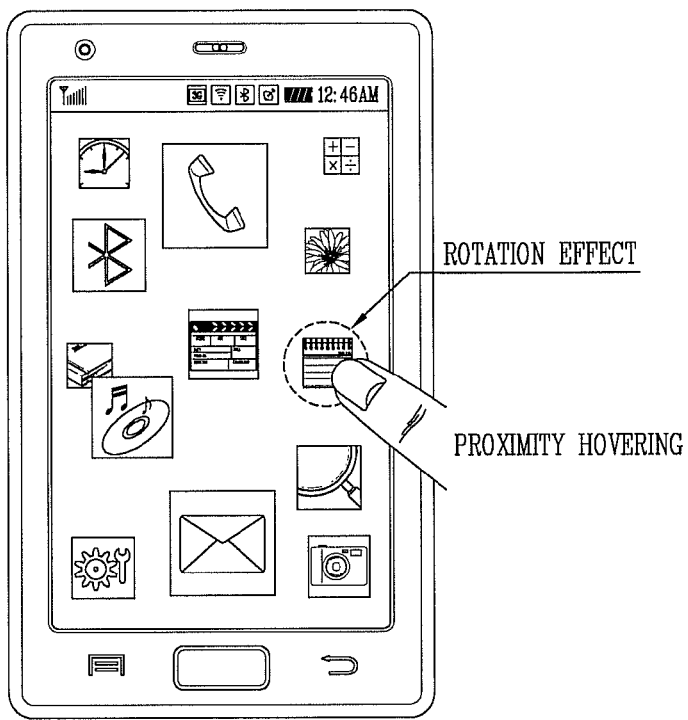
FIG. 13 is a view showing an example to control a specific effect and depth of a 3D icon using proximity hovering according to the present invention.

FIG. 13 is a view showing an example to control a specific effect and depth of a 3D icon using proximity hovering according to the present invention.

In the present invention, at least one application may have an icon effect in 3D space. The icon effect includes visible and audible effects, and the icon effect indicates that a corresponding icon has been selected.

If a user's finger hovers over a specific 3D icon, the icon is rotated on its position or highlighted (color change, shape change, edge, etc.). In this state, the user's finger is upward or downward moved to control depth of the 3D icon to a desired level (0~256). If the 3D icon is moved to another position, depth of the 3D icon is controlled in correspondence to the position.

In the present invention, as aforementioned, a specific icon may be selected through proximity hovering, and then may be moved to a desired position through drag.

Figure 14:
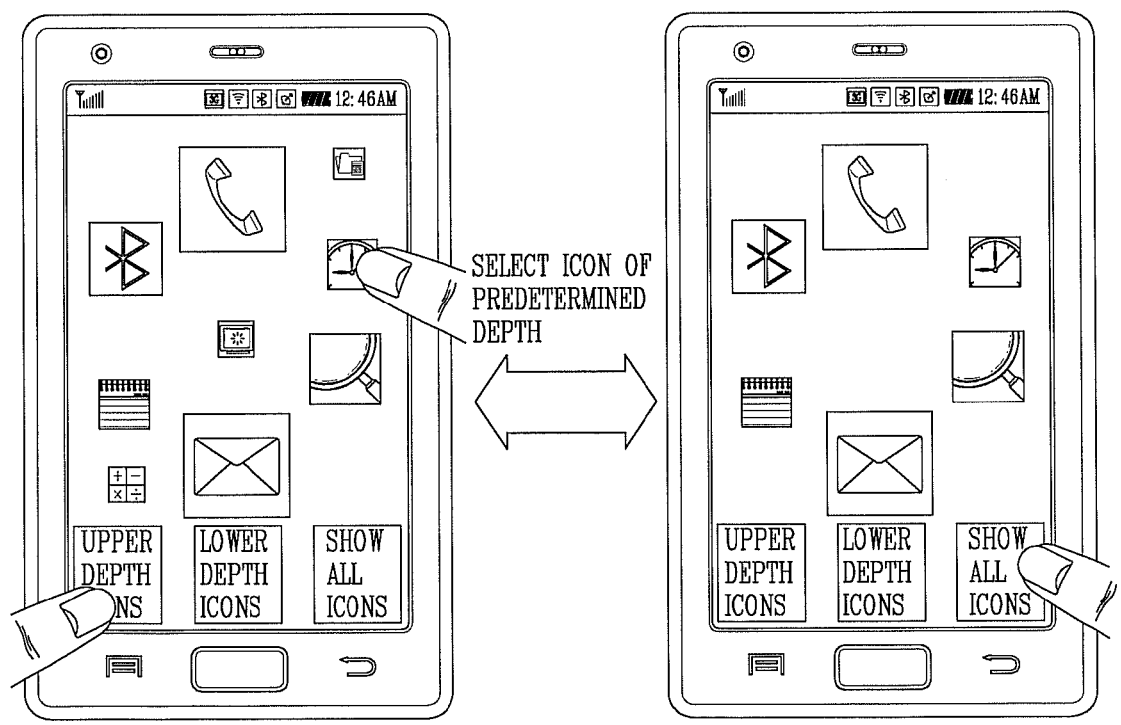
FIG. 14 is a view showing an example to execute a function to hide a 3D icon according to depth according to the present invention.

FIG. 14 is a view showing an example to execute a function to hide 3D icons according to depth according to the present invention.

A user selects a depth control icon (or menu). The depth control icon or menu may be selected through long-hold on a predetermined position, or may be selected from a user's menu. The depth control icon or menu includes 'upper depth icons', 'lower depth icons', and 'show all icons'.

If the 'upper depth icons' is selected from the plurality of menus and an icon of a particular depth is selected, the controller 180 displays only icons having a higher depth than the particular depth of the selected icon, but hides icons having a lower depth than the particular depth. In this state, if the user wishes to view the entire icons, the menu (icon) of 'show all icons' is selected to display all the original 3D icons.

In the present invention, the user can view icons having depth more than or lower than a particular depth without using the additional depth control icon. For instance, if the user approaches to an icon of a particular depth to perform 'long hold & up', icons having depth more than the particular depth can be displayed. On the other hand, if the user performs 'long hold & down', icons having depth lower than the particular depth can be displayed.

In the present invention, when the user approaches to a 3D object, an indication icon can be displayed according to a moving path of the 3D object.

Figure 15:
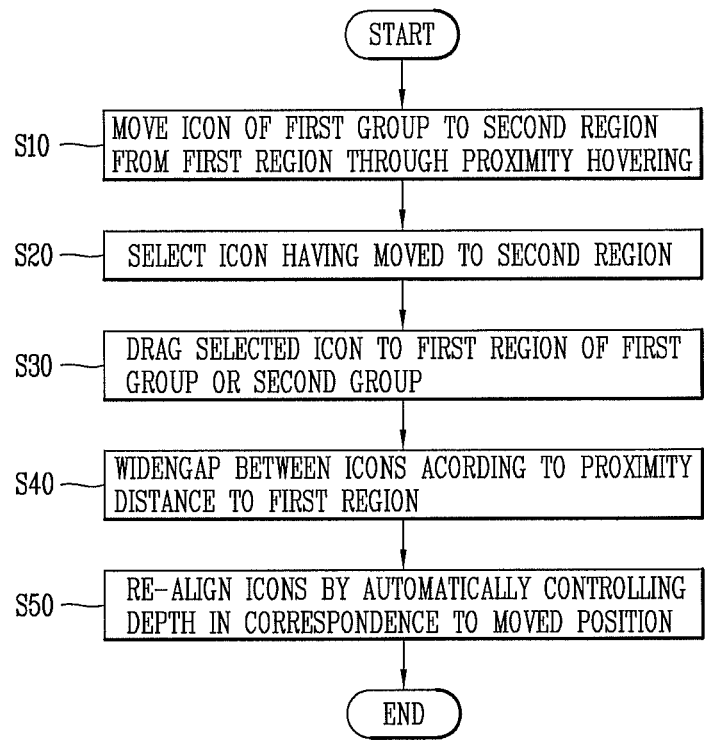
FIG. 15 is a flowchart showing a method for controlling 3D images of a mobile terminal using proximity touch according to the present invention.

FIG. 15 is a flowchart showing a method for controlling 3D images of a mobile terminal using proximity touch according to the present invention. FIG. 15 is related to FIGS. 1 and 6.

As shown in FIG. 15, alignment of stereoscopic images (3D images) includes re-alignment. The alignment (or re-alignment) is performed by defining inside of a proximity region of a 3D image as a first region, and by defining outside of the proximity region as a second region.

In a state where at least one 3D group is displayed, the user may move 3D objects (icons, widgets, photos, menus, images and thumbnails) included in a specific 3D group (first 3D group) outside the first region (to the second region), through touch gesture (proximity hovering, proximity hold, proximity drag, etc.) (S10). Here, the 3D object having moved to the first region is not fixed, but is temporarily positioned. Therefore, if the user returns to the home screen, the 3D object returns to the original position.

In the present invention, a specific 3D object included in the 3D group can be moved to the second region by displaying the 3D object on the transparent screen (first region) in the form of a 2D object, and then by moving the 3D object to a region outside the transparent screen (i.e., second region). In this case, the 3D object having moved to the second region is fixed to the corresponding position even if the user returns to the home screen.

The user may select the 3D object (temporarily displayed or fixedly displayed) through proximity touch, and then move the selected 3D object to the same or another 3D group (S20, S30). Here, said another group is called a second 3D group.

The selected 3D object is moved through proximity touch & drag. Once the 3D object inside the second region is moved to a first region of the second 3D group through proximity touch & drag, the controller 180 widens the gap between 3D objects included in the second 3D group, according to a proximity distance to the first region (S40).

The distance between the 3D objects is increased as an approaching distance to the corresponding icon becomes short.

Accordingly, the controller 180 automatically re-aligns the 3D object as a new object included in the second 3D group, with depth corresponding to the proximity position (S50).

The moved 3D object is inserted into the widened gap in the following two manners.

Firstly, an insertion position is automatically set according to depth of the moved 3D object, and a gap between two 3D objects adjacent to the insertion position is widened. According to this method, the insertion position is visually provided. This may solve a user's difficulty in identifying depth of a 3D object.

Secondly, once the 3D object has moved to a specific position between the 3D objects having a wide gap therebetween, the controller 180 automatically controls depth of the 3D object in correspondence to the position.

As aforementioned, in the present invention, aligning, moving and re-aligning a specific 3D object inside a 3D object group are performed, through various proximity gestures, especially proximity hovering. And, depth of the 3D object is automatically controlled by the various operations. This may provide various 3D-related interfaces to a user.

The aforementioned method may be implemented as a program code stored in a computer-readable storage medium. The storage medium may include ROM, RAM, CD-ROM, a magnetic tape, a floppy disc, an optical data storage device, etc. And, the storage medium may be implemented as carrier wave (transmission through the Internet). The computer may include the controller of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A three dimensional (3D) image controlling method of a mobile terminal, the method comprising:
    displaying a first group of 3D objects displayed to overlap each other, each of the 3D objects in the first group having a different perceived depth;
    displaying a second group of 3D objects displayed to overlap each other, each of the 3D objects in the second group having a different perceived depth;
    hovering a 3D object of the first group through a proximity gesture;
    moving the hovered 3D object outside a proximity region of the first group;
    moving the moved 3D object to a proximity region of the second group; and
    changing the perceived depth of at least one of the 3D objects aligned in the second group according to a proximity distance of the moved 3D object to the proximity region of the second group, wherein the changing the perceived depth of the at least one of the 3D objects aligned in the second group includes widening a gap in perceived depth between 3D objects included in the second group according to the proximity distance.

2. The method of claim 1, wherein the 3D object includes at least one of an icon, a gallery, a widget, a menu or an image.

3. The method of claim 1, wherein the proximity gesture is proximity hovering.

4. The method of claim 1, wherein the 3D object has a different hovering speed according to a finger's proximity distance and proximity speed, and the hovered 3D object displays information on the hovering.

5. The method of claim 1, further comprising displaying all 3D objects of the first group in an automatic circulating manner when the proximity gesture is maintained for a first period of time.

6. The method of claim 1, wherein the hovered 3D object moves outside the proximity region through a proximity short drag input, and at the same time, is shifted to a rearmost side of the first group.

7. The method of claim 6, wherein the 3D object having moved outside the proximity region is temporarily displayed on the corresponding position, and returns to the original position of the first group when the current screen changes into a home screen.

8. The method of claim 1, wherein the step of moving the 3D object outside a proximity region of the first group includes:

holding the hovered 3D object for a first period of time;

displaying a window that includes the plurality of 3D objects of the first group when the hovered 3D object is maintained for a second period of time, the window being transparent;

displaying all 3D objects of the first group in the window in the form of 2D objects; and moving the displayed 2D objects outside the window through a drag input.

9. The method of claim 8, wherein the 3D object having moved outside the proximity region is displayed on the corresponding position in a fixed manner.

10. The method of claim 8, wherein the window for the first group and a window for the second group are individually displayed.

11. The method of claim 8, wherein, when the first and second groups are displayed in respective windows, the 2D objects move between the windows through a proximity touch & drag input.

12. The method of claim 8, further comprising displaying an option menu when the 3D object having moved outside the window of the first group is moved back into the window of the first group.

13. The method of claim 1, wherein changing the perceived depth of the 3D object includes:

guiding a position corresponding to a perceived depth of the hovered 3D object; and controlling the perceived depth of the 3D object having moved to the guided position, and thereby re-aligning the 3D objects included in the second group.

14. The method of claim 1, wherein changing the perceived depth of the 3D object includes:

inserting the moved 3D object between the 3D objects having the widened gap; and automatically controlling a perceived depth of the 3D object according to the insertion position, and thereby re-aligning the 3D objects included in the second group.

15. A mobile terminal, comprising:

a display unit configured to display a plurality of groups of 3D objects, each group having a plurality of 3D objects that overlap each other and having different perceived depths;

a sensing unit configured to sense a proximity gesture with respect to a 3D object of a first group of 3D objects; and a controller configured to move the 3D object outside a proximity region of the first group according to the sensed proximity gesture, and to align the 3D object with a second group of 3D objects by changing a perceived depth of at least one of the 3D objects in the second group according to a proximity distance of the moved 3D object to the proximity region of the second group, when the 3D object positioned outside the proximity region of the first group has moved to the proximity region of the second group, wherein, when the controller changes the perceived depth of the at least one of the 3D objects in the second group, the controller is configured to widen a gap in perceived depth between 3D objects included in the second group according to the proximity distance.

16. The mobile terminal of claim 15, wherein the 3D object includes at least one of an icon, a gallery, a widget, a menu or an image.

17. The mobile terminal of claim 15, wherein the proximity gesture is proximity hovering.

18. The mobile terminal of claim 15, wherein the 3D object has a different hovering speed according to a finger's proximity distance and proximity speed, and the hovered 3D object displays information on the hovering.

19. The mobile terminal of claim 15, wherein the controller displays all 3D objects of the first group in an automatic circulating manner when the proximity gesture is maintained for a first period of time.

20. The mobile terminal of claim 15, wherein the controller is configured to move the hovered 3D object outside the proximity region when a proximity short drag input is sensed after a proximity hovering input has been sensed, and to shift the hovered 3D object to a rearmost side of the first group.

21. The mobile terminal of claim 20, wherein the 3D object having moved outside the proximity region is temporarily displayed on the corresponding position, and returns to the original position of the first group when a home screen is displayed.

22. The mobile terminal of claim 15, wherein the controller is configured to display all 3D objects of the first group in a window as 2D objects when the 3D object is hovered for a second period of time, and is configured to move a specific 3D object outside the window through a drag input.

23. The mobile terminal of claim 22, wherein when the first and second groups are displayed in respective windows, the controller is configured to move the 2D object between the windows through a proximity touch & drag input.

24. The mobile terminal of claim 22, wherein the controller is configured to display an option menu when the 3D object having moved outside the window of the first group is moved back into the window of the first group.

25. The mobile terminal of claim 15, wherein the controller is configured to guide a position corresponding to a perceived depth of the hovered 3D object, and configured to control the perceived depth of the 3D object having moved to the guided position thereby to re-align the 3D objects included in the second group.

26. The mobile terminal of claim 15, wherein the controller is configured to insert the moved 3D object between the 3D objects having the widened gap, and configured to automatically control a perceived depth of the 3D object according to the insertion position.

* * * * *